United States Patent [19]

Stetson et al.

[11] Patent Number: 4,528,613
[45] Date of Patent: Jul. 9, 1985

[54] CERAMIC GLASS MATERIAL, CAPACITOR MADE THEREFROM AND METHOD OF MAKING THE SAME

[75] Inventors: Harold W. Stetson, Newtown; Nellie L. Cabato, Plymouth Meeting, both of Pa.

[73] Assignee: TRW Inc., Redondo Beach, Calif.

[21] Appl. No.: 583,153

[22] Filed: Feb. 24, 1984

[51] Int. Cl.³ .......................... H01G 4/12; H01B 1/06
[52] U.S. Cl. .................................. 361/321; 29/25.42; 252/520; 501/137
[58] Field of Search ............... 361/320, 321; 29/25.42; 252/520; 501/137; 65/155; 156/89

[56] References Cited

U.S. PATENT DOCUMENTS

| | | | |
|---|---|---|---|
| 3,619,220 | 11/1971 | Maher | 106/39 R |
| 3,666,505 | 5/1972 | Hoffman et al. | 106/39 R |
| 3,673,119 | 6/1972 | Ueoka et al. | 252/520 |
| 3,682,766 | 8/1972 | Maher | 161/196 |
| 3,811,937 | 5/1974 | Maher | 161/196 X |
| 3,885,941 | 5/1975 | Maher | 65/18 |
| 3,902,102 | 8/1976 | Burn | 252/513 X |
| 4,027,209 | 5/1977 | Maher | 361/361 |
| 4,101,952 | 7/1978 | Burn | 361/320 X |
| 4,246,625 | 1/1981 | Prakash | 361/321 |
| 4,308,570 | 12/1981 | Burn | 361/320 |
| 4,308,571 | 12/1981 | Tanei et al. | 361/321 |
| 4,379,319 | 4/1983 | Wilson | 361/321 |

OTHER PUBLICATIONS

Microelectronics and Reliability, vol. 7, Pergamos Press, 1968, Gr. Bt., pp. 131–135.
Solid State Technology, May 1970, pp. 63–66.
Journal of Materials Science 14, 1979, pp. 2453–2458.
Journal of Materials Science 15, 1980, pp. 2113–2115.

Primary Examiner—Donald A. Griffin
Attorney, Agent, or Firm—John T. Wiedemann; Jacob Trachtman

[57] ABSTRACT

A ceramic glass material comprising a mixture of fine particles of barium titanate, leaded glass frit and an additive material containing manganese. A ceramic glass body and capacitor made from the material by firing the ceramic glass material to a peak temperature between 900° C. and 1050° C. in a non oxidizing atmosphere at which the glass softens. The capacitor has non precious metal electrodes with a melting point above the firing temperature which are co-fired with the ceramic glass material. Upon cooling the fired ceramic glass material and electrodes form a capacitor with the ceramic glass body separating the electrodes and providing a high dielectric constant and insulation resistance, and a low dissipation factor.

64 Claims, 3 Drawing Figures

CERAMIC GLASS MATERIAL, CAPACITOR MADE THEREFROM AND METHOD OF MAKING THE SAME

BACKGROUND OF THE INVENTION

The invention relates to a ceramic glass material, capacitors made using the material, and the method of making same. More particularly, the ceramic glass material provides a high dielectric constant with low dissipation factor and high insulation resistance when fired in a non oxidizing atmosphere to produce capacitors with non precious metal electrodes.

Ceramic glass capacitors have been produced by firing in air at low temperatures as disclosed in Pat. No. 3,619,220. Such capacitors however have required noble metal conductors which are resistant to oxidation. Use of non precious metal conductors such as copper has required firing in a low oxygen atmosphere and a special borosilicate glass formulation which is resistant to reduction and has a softening point below the melting point of the metal as described in Pat. No. 4,101,952. This patent also states that no known high dielectric constant glass ceramic materials are believed to be capable of sintering in a low partial oxygen atmosphere without experiencing greatly degraded electrical properties, and that oxides of lead, cadmium and bismuth have a major defect of being readily reduced and renders the material conductive when heated in a low partial atmosphere. Pat. No. 4,308,570 also teaches that in order to be reduction resistant when fired at a temperature of about 1050° C. in an environment of about $10^{-11}$ atmospheres of oxygen, the oxides of lead, bismuth and cadmium must be excluded from the glass of a glass ceramic capacitor. The prior art, thus, teaches that the leaded glasses which have been found to be desirable for use in ceramic glass capacitors as disclosed in Pat. No. 3,619,220 are unsuitable for firing in a non oxidizing atmosphere necessary for co-firing with non precious or base metal electrodes. The use of leaded glass compositions, however, are desirable for producing the ceramic glass capacitors since they are highly compatible with the ceramic materials, bond tightly to substrates such as alumina and provide expansion coefficients which minimize separation and deterioration of the capacitors. This is especially important when capacitors are produced by a build up of a plurality of layers of dielectric and conductive materials. It is therefore desirable to provide a ceramic glass composition using leaded glass which can be fired in an non oxidizing atmosphere without deterioration to form a dielectric material with a low dissipation factor, and high insulation resistance and dielectric constant, and which can be co-fired with base metal conductors such as copper.

SUMMARY OF THE INVENTION

It is therefore a principal object of the invention to provide a new and improved ceramic glass material, capacitor made therefrom and method of making same which utilizes leaded glass for providing highly desirable properties.

Another object of the invention is to provide a new and improved ceramic glass material, capacitor made therefrom and method of making same utilizing leaded glass which can be fired in a non oxidizing atmosphere to produce a ceramic glass body with highly desirable properties.

Another object of the invention is to provide a new and improved ceramic glass material, capacitor made therefrom and method of making same which can be fired in a non oxidizing atmosphere to produce a capacitor with base metal electrodes and highly desirable properties.

Another object of the invention is to provide a new and improved ceramic glass material, capacitor made therefrom and method of making same which may be used to provide ceramic glass capacitors with a low dissipation factor, and high insulation resistance and dielectric constant.

Another object of the invention is to provide a new and improved ceramic glass material, capacitor made therefrom and method of making same which is compatible with the method for producing non precious metal thick film electrical components.

Another object of the invention is to provide a new and improved ceramic glass material, capacitor made therefrom and method of making same which utilizes leaded glass and may be fired at a low temperature and in a non oxidizing atmosphere to provide a dielectric body with desirable properties of low dissipation factor, and high insulation resistance and dielectric constant.

Another object of the invention is to provide a new and improved ceramic glass material, capacitor made therefrom and method of making same utilizing base metal electrodes such as copper conducting materials without affecting the integrity or conducting properties of the electrodes.

Another object of the invention is to provide a new and improved ceramic glass material, capacitor made therefrom and method of making same using inexpensive materials for producing low cost electrical capacitor components with the highly desirable properties obtained with air fired thick film materials utilizing precious metals.

The above objects as well as many other objects of the invention are achieved by providing a ceramic glass material comprising a mixture of selected amounts of fine particles of a ceramic material such as barium titanate, leaded glass frit and an additive material. The additive material contains manganese for being provided to the mixture, and can be manganese resinate, fine particles of manganese dioxide, manganese nitrate, or other such suitable materials. The manganese provided by the additive material should be in an amount of approximately 0.2% to 1% by weight of the mixture, and preferably between 0.3 and 0.5%. The leaded glass frit may be lead, cadmium, bismuth glass frit, or other low softening point leaded glass frits providing the desirable properties. To form the ceramic glass body having the desirable properties, the mixture is fired for about 30 to 60 minutes in a non oxidizing atmosphere to a peak temperature between approximately 900° C. and 1025° C. at which the glass softens, and is then cooled to form the ceramic glass body.

To form a thick film capacitor, a conductor layer of a non precious metal which does not melt at the firing temperature may be applied to the surface of a suitable substrate which may be an insulator such as alumina or another compatible material. A solid body of a base metal conductor such as copper or Invar may also be used as a substrate. The ceramic glass mixture is applied at least partially over the conductor on the substrate and after being dried, a conductive coating material including a non precious metal such as copper, having a melting point above the firing temperature is applied to the exposed top surface of the coated mixture opposite to its bottom surface contacting the conductor on the substrate. The coated substrate is fired in a non oxidizing atmosphere to a selected peak temperature between approximately 900° and 1025° C. Upon cooling, a ceramic glass body with a low dissipation factor and high insulation resistance and dielectric constant is formed on the substrate between opposite electrodes to provide an electrical capacitor. When an increased thickness of the dielectric layer is desired, the method provides for applying a plurality of intermediate layers of the ceramic glass material, each of which is fired prior to the application of the succeeding layer. The final layer of ceramic glass material, however, is co-fired with the final conductive layer.

The invention accordingly comprises a composition of matter, the product formed therewith, and method of making the product possessing the characteristics, properties and relation of the constituents which will be exemplified in the composition hereinafter described, with the scope of the invention being indicated by the claims.

DESCRIPTION OF THE DRAWING

For a fuller understanding of the nature and objects of the invention, reference should be had to the following detailed description taken in conjunction with the accompanying drawing, in which.

Like reference numerals designate like parts throughout the several views.

DETAILED DESCRIPTION

Figure 1:
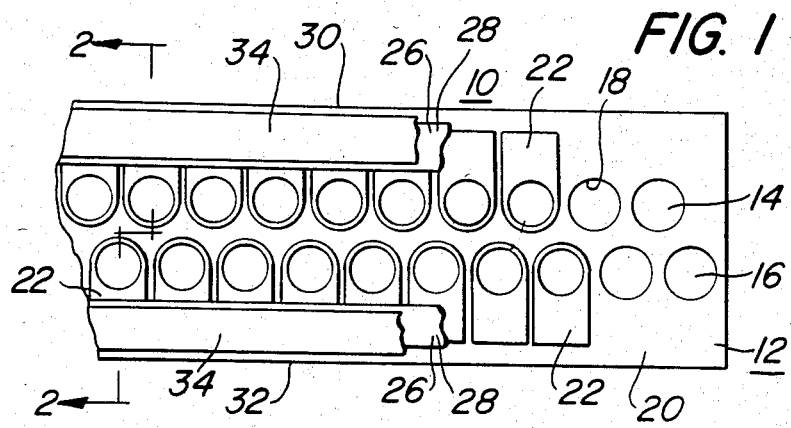
FIG. 1 is a top plane view of a filter plate providing a plurality of capacitor elements embodying the invention with portions broken away.

In order to reduce the cost of producing electrical components, it has been desirable to utilize non precious metals such as nickel and copper in place of the previously used noble metals such as platinum, gold and silver for providing electrical conductors and contacts in the form of metal films and metal glaze coatings. In order to use such base metals for fired conductive coatings, it has been found necessary to fire such coatings in non oxidizing environments and at temperatures below the melting point of the metal. This has resulted in the development of resistive glazes which can be fired in non oxidizing atmospheres and at low temperatures compatible with the low melting temperatures of such base metal resistor materials. Similarly, for the purpose of producing capacitor elements having non precious metal electrodes, it was also found necessary to provide dielectric materials which could be fired at a low temperature in a non oxidizing atmosphere. It was also required that such dielectric materials provide a high dielectric constant with a low dissipation factor and high insulating resistance. Since prior art materials which provided high dielectric constants and other desirable properties required high sintering temperatures, they were unsuitable for use with the base metal electrodes which have lower melting points. Most of the prior art glass ceramic materials developed for firing at a lower temperature comprised a mixture of ceramic material and leaded glass, which still required firing in air to prevent deterioration of the dielectric properties. A ceramic glass material disclosed in Pat. No. 4,101,952 for firing at a low temperature in a reducing atmosphere required a special glass composition which avoids the use of lead, cadmium, and bismuth since these materials were found to be reduced when fired in a non oxidizing atmosphere even at a low temperature. The present invention has the advantage of permitting the use of the desirable leaded glass compositions, which previously required firing in air to provide ceramic glass bodies with the desired properties. The leaded glass compositions can be co-fired with base metal materials such as copper to produce inexpensive capacitors with the same desired properties. The production of the capacitors is compatible with the making of other thick film components fired at low temperature and in non oxidizing atmospheres. Although such leaded glass frits, have been used previously for producing ceramic glass bodies and capacitors fired in air with precious metal conductors, they are now utilized for providing the ceramic glass material of the invention and producing the dielectric layer of an electrical capacitor with non precious metal electrodes.

To provide the ceramic glass material of the invention, a ceramic material such as barium titanate providing good dielectric properties is used in the form of a fine powder of approximately 1 micron. The ceramic material is mixed in desired proportions with fine particles of a leaded glass frit such as lead, cadmium, bismuth glass frit or other suitable low softening point leaded glass frits providing the desired properties. Additive material for providing manganese such as manganese resinate, or fine particles of manganese dioxide or manganese nitrate are added to the mixture. The mixture is ball milled either before or after the addition of the additive material for at least 4 hours in isopropyl alcohol, deionized water or other suitable liquid, to provide the mixture with particles of $-300$ to $-400$ mesh (Standard Seeve Size). The mixture is dried at 150° C. for approximately 12 hours, after which it is mixed with a suitable vehicle and its viscosity adjusted for screen printing or other means of application to the surface of a substrate.

For providing capacitors with the desired properties the fine particles of ceramic material, leaded glass frit and additive material providing manganese are combined in certain proportions. The manganese materials are added to provide a content of manganese by weight of approximately 0.2% to 1% of the mixture. A content of manganese of 0.3% to 0.5% is preferred for providing the fired ceramic glass body with dielectric constants of 1000 and higher, a dissipation factor of less than 5% and even as low or lower than 3%, and an insulation resistance as high as $10^4$ megohms and higher. The substrate utilized may be of an insulating or conducting material which has an expansion coefficient compatible with the ceramic glass material, and forms strong bonds therewith after being fired, such as alumina and Invar. Such substrates may be covered with a non precious metal foil of copper to form a bottom base electrode for being coated by the ceramic glass material to provide a plurality of capacitors on the substrate. The bottom conductors also may be provided in other manners well known in the art, such as by screen printing of a conductive glaze composition, electroless plating and other coating processes. Although the use of a metal glaze for the bottom base electrode is not essential, if such a glaze is utilized for the base or counter electrodes it is preferable that they include a glass composition which is the same used in the ceramic glass material. This has been found to enhance the properties of the capacitors produced in accordance with Pat. No. 3,666,505. A metal glaze material found to be desirable and utilized by the invention comprises a copper powder mixed with glass frit having the same composition as the glass of the ceramic glass material, with the glass comprising approximately 3% by weight of the conductive glaze mixture.

In carrying out the method of the invention, a firing temperature is desirable in the range between about 900° C. and 1025° C. at which the glass of the ceramic glass mixture softens and which is below the melting point of the metal conductor. A non oxidizing atmosphere such as nitrogen with an oxygen content of 10 parts per million or less has been found to be suitable to avoid oxidation of the non precious metal conductor materials. A firing cycle with a period of 30 to 60 minutes having a peak temperature between 900° C. and 1050° C. has also been found to provide the desired sintering and formation of the capacitor elements. Under certain conditions, a peak temperature of about 1000° C. has been found to provide optimum properties for the capacitors.

Although barium titanate has been utilized as the ceramic material for providing the dielectric properties of the ceramic glass body, it is possible that other such materials may be used for the same purpose. Although not essential, it has also been found that under certain circumstances calcining the ceramic material, by heating the barium titanate at a temperature between 1050° C. and 1200° C. for a period of 2 hours prior to mixing with the glass frit and additive material enhances the dielectric constant of the fired ceramic glass body. Additive materials of manganese resinate, manganese dioxide and manganese nitrate have been found to provide desirable properties. In general, the best properties have been obtained by use of the manganese resinate for the ceramic glass material, although additional sources of manganese may also be suitable. From the examples provided, it will be obvious to those skilled in the art that under certain conditions these materials as well as other materials may provide the same or more desirable properties within the scope of the invention.

Figure 2:
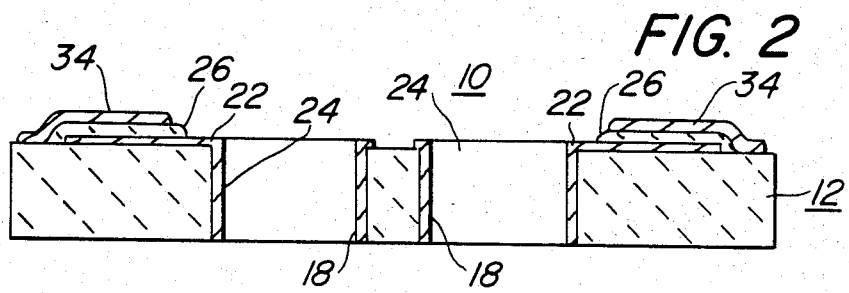
FIG. 2 is an enlarged sectional view taken on the line 2—2 of FIG. 1.

As a particular application, the FIGS. 1 and 2 disclose a filter plate 10 embodying the invention. The filter plate 10 comprises a substrate 12 made of an insulating material such as alumina. The substrate 12 has first and second rows 14, 16 of openings 18 positioned for receiving therethrough the pins of an electrical connector. The top surface 20 of the substrate 12 has areas covered by electrical conductors 22 encompassing each of the openings 18. The conductors 22 are formed to provide a cylindrical conducting surface 24 extending through each of the openings 18 of the substrate 12 as shown in FIG. 2. Each of the conductors 22 with its cylindrical conducting portion 24 may be formed by any well known method such as electroless plating, etching of a foil surface or by use of a thick film conductive paste. Non precious metals may be used such as copper and nickel, which have melting points higher than the peak temperature utilized for firing of the ceramic glass composition. The ceramic glass material 26 utilized, is applied over at least a portion of each of the spaced conductors 22 such as by screening the strips 28 in a direction along and spaced from the edges 30, 32, but not covering the openings 18 and the conductive cylindrical portions 24 of the conductors 22. The strips 28 are preferably applied by screen stenciling to a thickness of approximately 1 to 2 mils. After being dried by heating in air to a temperature of 125° C. for 30 minutes, a second strip or layer 34 of a conductive material is applied over each of the strips or layers 28. The conductive layers 34 are preferably applied by screen stenciling, although other methods of application may be utilized. The conductive layers 34 are composed of a thick film glaze material preferably containing the same glass composition present in the ceramic glass material 26 mixed with particles of a non precious metal such as copper powder. After being dried, the coated substrate 12 is fired in a non oxidizing atmosphere of nitrogen containing less than 10 parts per million of oxygen to a peak temperature between 900° C. and 1025° C. on a 30 to 60 minute cycle. When the substrate is cooled, a plurality of capacitors are formed on the substrate 12 having a separate bottom or base electrode or conductor 22 for each of the capacitors and a common top or counter electrode provided by the conductive layers 34. The conductors 22 are separated from the conductive layers 34 by the intermediate dielectric body formed of the glass ceramic material 26. The dielectric body has a low dissipation factor of 5% or less at 1 KHz and 25° C., high insulation resistance of $10^4$ megohms or greater at 100 volts and 25° C., and a high dielectric constant of about 1000 or higher at 1 KHz and 25° C. A break down voltage of greater than 500 volts DC per mil has been obtained for thicknesses of the dielectric body of between 1 to 2 mils.

Figure 3:
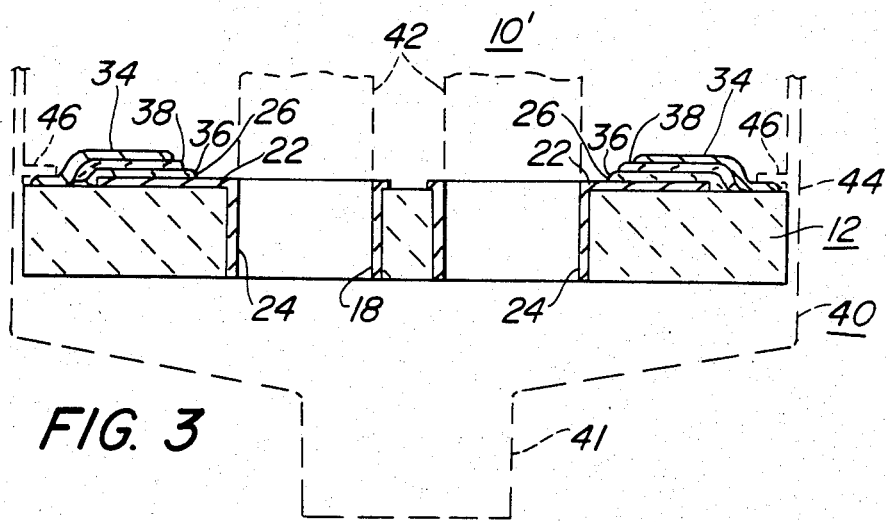
FIG. 3 is a sectional view similar to that of FIG. 2 illustrating a modified form of the filter plate.

In many instances it is desirable to produce the intermediate dielectric body by firing a series of thin layers of the ceramic glass material 26 to avoid defects such as pin holes and irregularities which are more likely to occur when firing a single thicker layer. FIG. 3 discloses a filter plate 10' of modified form, having a plurality of intermediate layers 36, 38 of the material 26 for forming the thicker composite dielectric layer or body between the base electrodes or conductors 22 and the counter electrodes or top conductive layers 34. For providing the filter plate 10', the ceramic glass layer 36 is applied over the conductors 22 and fired in a manner described in connection with the filter plate 10. After cooling, the second ceramic glass layer 38 and the conductive layer 34 are applied as described above in connection with the filter plate 10, and fired to produce the filter plate 10'. Should additional intermediate layers of the ceramic glass material 26 be desired for the purpose of building up the total thickness of the dielectric body, they may each be separately applied and fired prior to the application of the succeeding layer. Intermediate conductive layers may also be provided to form stacked capacitors when desired.

The filter plates 10, 10' are designed for use in in an electrical connector 40 such as illustrated in FIG. 3 by the dashed lines representing the male portion 41 having a plurality of metal pins 42 which are received through the openings 18. Each of the pins 42 makes electrical contact with the cylindrical portion 24 of a conductor 22 of one of the capacitors provided by the filter plate 10'. The outer metal casing 44 of the male terminal 41 may be connected at locations 46 with the common counter electrodes or conductive layers 34 of the filter plate 10', so that each of the pins 42 is returned through a capacitor element to the casing 44 for providing radio frequency by-pass filtering for the connector 40. Of course the invention may have many other applications which will be obvious to those skilled in the art.

The following examples are given to illustrate certain preferred details of the invention, it being understood that the details of the examples are not to be taken as in any way limiting the invention thereto.

EXAMPLE 1

Several batches of a ceramic glass material were made by mixing together a ceramic material of powdered barium titanate ($BaTiO_3$) and a leaded glass frit. The barium titanate was precalcined at a temperature between 1050° C. and 1200° C. for 2 hours, and the leaded glass had the composition by weight of 36% cadmium oxide (CdO), 23% bismuth trioxide ($Bi_2O_3$), 25% lead oxide (PbO), 5% zinc oxide (ZnO), 1% aluminum oxide ($Al_2O_3$), 5% boron oxide ($B_2O_3$), and 5% silicon dioxide ($SiO_2$). Manganese resinate material from Engelhard, Inc. designated No. 55C were added to the mixture. The ratio by weight of glass frit to ceramic particles was kept constant at 0.32 and each batch was provided with a different percentage of manganese resinate, namely 3%, 3.65%, 6% and 1% as shown in Table 1. The manganese resinate contained manganese in the amount of 1/10 of its weight so that the content of manganese in the various batches corresponded to 0.3%, 0.365%, 0.6% and 1%. Each batch was ball milled in butyl carbitol acetate for 48 hours to provide particles of 1 to 5 microns diameter.

After removing the liquid vehicle from each batch, the remaining mixture was blended with an ethyl cellulose screening vehicle on a three roll mill. The various glass ceramic materials were applied by screening onto alumina substrates over solid copper base conductors previously applied to the substrate. The ceramic glass material was dried for 20 minutes at 125° C., and then fired to a peak temperature of 1000° C. on a 30 minute cycle in a nitrogen atmosphere having less than 10 parts per million of oxygen. A second glass ceramic layer of the same composition was applied over the fired ceramic layer and dried as before. A layer of conductive copper paste was then applied over the second ceramic glass layer and dried for 10 minutes at 125° C. The conductive paste was composed of copper metal powder having particles of 1 to 2 microns obtained from Greze Company mixed with copper oxide particles and leaded glass frit of the same composition as used for the ceramic glass material. The mixture contained by weight 95.5% copper particles, 3.5% leaded glass frit and 1% copper oxide ($Cu_2O$) particles. An ethyl cellulose vehicle with Texenol was added to the conductive powder mixture for screen printing over the second ceramic glass layer. The coated substrates were again fired in the same manner described in connection with the first layer of the ceramic glass material and cooled to provide the capacitors.

Table 1 shows the dielectric and electrical properties of the various capacitors made in accordance with Example 1, in which the dielectric constant and dissipation factor were measured at 1 KHz and 25° C., the insulation resistance was measured at 100 volts DC and 25° C., and the capacitors were measured and found to provide a break down voltage of greater than 500 volts DC per mil.

TABLE 1

|  | MANGANESE RESINATE (% by weight) | | | |
| --- | --- | --- | --- | --- |
|  | 3 | 3.65 | 6 | 10 |
| Dielectric Constant (K) | 1200 | 1350 | 1400 | 1165 |
| Dissipation Factor (%) | 3.89 | 2.82 | 3.78 | 2.97 |
| Insulation Resistance (MΩ) | $3.5 \times 10^3$ | $1.5 \times 10^5$ | $1.4 \times 10^3$ | $1 \times 10^4$ |
| Capacitance Density (nf/in²) | 281 | 111 | 318 | 261 |
| Dielectric Thickness (mils) | 1 | 2 | 1 | 1 |

EXAMPLE 2

A ceramic glass material was made in the same manner as in Example 1, except that the mixture was composed by weight of 75.75% barium titanate ($BaTiO_3$), 20.45% leaded glass frit, and 3.75% manganese resinate corresponding to a manganese content of 0.375%. The materials were coated on substrates in the same manner as described in Example 1, except that the batches of coated substrates were separated into three groups which were respectively fired at peak temperatures of 900° C., 1000° C. and 1025° C. Table 2 shows the dielectric and electric properties of the various capacitors made in accordance with Example 2.

TABLE 2

|  | FIRING TEMPERATURE (°C.) | | |
| --- | --- | --- | --- |
|  | 900 | 1000 | 1025 |
| Dielectric Constant (K) | 700 | 1500 | 1475 |
| Dissipation Factor (%) | 2.41 | 2.04 | 1.95 |
| Insulation Resistance (MΩ) | $3.4 \times 10^5$ | $5.5 \times 10^4$ | $2.8 \times 10^4$ |
| Capacitance Density (nf/in²) | 88 | 209 | 236 |
| Dielectric Thickness (mils) | 1.8 | 1.68 | 1.4 |

EXAMPLE 3

Batches of ceramic glass material were made in the same manner as in Example 2. Substrates were coated with the materials in the same manner as in Example 2, except that the batches of coated substrates were separated into four groups. The first and second groups were fired to a peak temperature of 900° C. on cycles of 30 minutes and 60 minutes respectively and the third and fourth groups were fired to a peak temperature of 1025° C. on cylces of 30 minutes and 60 minutes respectively. Table 3 shows the dielectric and electric properties of the various capacitors made in accordance with Example 3.

TABLE 3

|  | FIRING TEMPERATURE (°C.) | | | |
| --- | --- | --- | --- | --- |
|  | 900° C. | | 1025° C. | |
|  | 30' | 60' | 30' | 60' |
| Dielectric Constant (K) | 700 | 700 | 1475 | 1700 |
| Dissipation Factor (%) | 2.41 | 2.17 | 1.95 | 1.90 |
| Insulation Resistance (MΩ) | $3.4 \times 10^5$ | $>10^4$ | $2.8 \times 10^4$ | $>10^4$ |
| Capacitance Density (nf/in²) | 88 | 98 | 236 | 288 |
| Dielectric Thickness (mils) | 1.8 | 1.8 | 1.4 | 1.36 |

EXAMPLE 4

Batches of ceramic glass materials were made in the same manner as described in Example 1, except that different proportions of ceramic, glass and additive particles were used as shown in Table 4 and the manganese present corresponded to 1/10 by weight of the additive material. The materials were coated and processed in the same manner as described in Example 1. Table 4 shows the dielectric and electrical properties of the various capacitors made in accordance with Example 4.

TABLE 4

|  | COMPOSITION (Wt %) | | |
|---|---|---|---|
| Ceramic | 80.6 | 72.99 | 50 |
| Glass | 15.3 | 23.36 | 40 |
| Additive | 4.0 | 3.65 | 10 |
| Dielectric Constant (K) | 600 | 1350 | 500 |
| Dissipation Factor (%) | 3.17 | 2.82 | 2.52 |
| Insulation Resistance (MΩ) | $6.1 \times 10^4$ | $1.5 \times 10^5$ | $1 \times 10^4$ |
| Capacitance Density (nf/in$^2$) | 75.7 | 111 | 100 |
| Dielectric Thickness (mils) | 1.8 | 1.1 |  |
| Firing Temperature (°C.) | 1000 | 1000 | 900 |

EXAMPLE 5

A first ceramic glass material was prepared as described in connection with Example 2. A second ceramic glass material was prepared in a manner similar to the first material, except that the manganese resinate was omitted from the mixture. Alumina substrates were coated and processed in accordance with the method described in Example 1 using each of the two ceramic glass compositions. Table 5 shows a dielectric and electrical properties of the various capacitors made in accordance with Example 5.

TABLE 5

|  | MANGANESE RESINATE (% by weight) | |
|---|---|---|
|  | 3.75 | 0 |
| Dielectric Constant (K) | 1500 | 1000 |
| Dissipation Factor (%) | 2.04 | 8.04 |
| Insulation Resistance (MΩ) | $5.5 \times 10^4$ | 40 |
| Capacitance Density (nf/in$^2$) | 209 | 172 |
| Dielectric Thickness (mils) | 1.4 | 1.68 |

EXAMPLE 6

A first ceramic glass material was prepared in accordance with the description in Example 1, except that the material was composed of a mixture of particles by weight of 20.45% barium titanate, 75.76% of the leaded glass frit, and 3.8% of manganese nitrate [$Mn(NO_3)_2$], manganese nitrate providing manganese in the mixture of 0.45% by weight. A second ceramic glass material was prepared as described in connection with Example 1, except that the material was composed of a mixture of particles by weight of 21.09% barium titanate ($BaTiO_3$), 78.14% of the leaded glass frit, and 0.762% of manganese dioxide ($MnO_2$), the manganese dioxide providing manganese by weight in the mixture of approximately 0.45%. The capacitors were made in accordance with the method described in connection with Example 1 using the first and second ceramic glass materials. The Table 6 shows the dielectric and electrical properties of the various capacitors made in accordance with Example 6.

TABLE 6

| Composition | 1 | 2 |
|---|---|---|
| Dielectric Constant (K) | 907 | 1100 |
| Dissipation Factor (%) | 4.99 | 3.36 |
| Insulation Resistance (MΩ) | $1 \times 10^4$ | $1 \times 10^4$ |
| Capacitance Density (nf/in$^2$) | 127 | 178 |
| Dielectric Thickness (mils) | 1.6 | 1.4 |

From the examples, the effects can be seen on the dielectric and electrical properties of the capacitors of the invention, of variations in the composition of the ceramic glass material and the method of making the ceramic glass body and the capacitors. Examples 1, 4, 5 and 6 show the effects of varying the compositions of the ceramic glass material, with Example 1 showing particular effects of varying the percentage of manganese and Example 4 showing the effects of varying the ratio of glass to ceramic material. Example 5 shows the effects produced by the presence and absence of manganese material in the composition, while Example 6 shows the effects produced by the use of additive particles of manganese dioxide and manganese nitrate. Example 2 shows the effects of varying the peak firing temperature between 900° C. and 1050° C., while Example 3 shows the effects of varying the firing cycle time for peak temperatures of 900° and 1025° C. The tables show the attainment of a high dielectric constant of 1000 and as high as 1700 under certain conditions, and dissipation factors of less than 5% and generally below 3% for preferred manganese content between 3% and 5%, as well as less than 2% for certain formulations and processing conditions. Insulation resistance greater than $10^5$ megohms were attained and, in general, values of at least $10^4$ megohms were easily achieved. Capacitance densities of several hundred nanofarads/square inch were readily achieved for dielectric thicknesses between 1 and 2 mils. The capacitors produced and tested were terminated by soldering to the copper base electrodes and copper glaze counter electrodes and were found to provide break down voltages of at least 500 volts DC per mil. The electrodes of the capacitors made in accordance with the invention were not oxidized or deformed by combining with reduced lead, but maintained their integrity and provided the desirable properties previously attained by using precious metal electrodes co-fired with glass ceramic materials in air. The use of the copper electrodes have the advantage of both reducing the cost of the capacitor and providing more solderable termination than the noble metals which are typically terminated with expensive precious metal materials such as platinum, palladium and gold.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

What is claimed is:

1. A ceramic glass material adapted to be fired in a non oxidizing atmosphere to form an insulating body characterized by a high dielectric constant comprising a mixture of fine particles of barium titanate, leaded glass frit and an additive material containing manganese.

2. The ceramic glass material of claim 1 in which the additive material containing manganese are selected from the group consisting of manganese resinate, manganese dioxide and manganese nitrate.

3. The ceramic glass material of claim 2 in which the additive material provides manganese in an amount of between about 0.2 and 1% by weight of the mixture.

4. The ceramic glass material of claim 3 in which the additive material provides manganese in an amount of between about 0.3 and 0.5% by weight of the mixture.

5. The ceramic glass material of claim 1 in which the mixture contains by weight between about 15 and 40% of the glass frit, and the additive material provides manganese in an amount of between about 0.2 and 1% by weight of the mixture.

6. The ceramic glass material of claim 5 in which the additive material provides manganese in an amount of between about 0.3 and 0.5% by weight of the mixture.

7. The ceramic glass material of claim 5 in which the glass frit is lead, cadmium, bismuth glass frit present in the amount of about 21% by weight of the mixture, and the additive material is manganese resinate and provides manganese in an amount of between about 0.3 and 0.5% by weight of the mixture.

8. The ceramic glass material of claim 1 in which the leaded glass frit is lead, cadmium, bismuth glass frit.

9. The ceramic glass material of claim 8 in which the additive material containing manganese is selected from the group consisting of manganese resinate, manganese dioxide and manganese nitrate.

10. The ceramic glass material of claim 9 in which the additive material provides manganese in an amount of between about 0.2 and 1% by weight of the mixture.

11. The ceramic glass material of claim 10 in which the additive material provides manganese in an amount of between about 0.3 and 0.5% by weight of the mixture.

12. The ceramic glass material of claim 11 in which the mixture contains by weight between about 15 and 40% of the glass frit.

13. The ceramic glass material of claim 12 in which prior to being mixed with the glass frit and additive material the barium titanate is calcined at a temperature between 1050° C. and 1200° C. for two hours.

14. A ceramic glass body fired in a non oxidizing atmosphere to form an insulating substance characterized by a high dielectric constant containing barium titanate and leaded glass through which manganese is dispersed.

15. The ceramic glass body of claim 14 in which the manganese is present in an amount of between about 0.2 and 1% by weight of the body.

16. The ceramic glass body of claim 15 in which the manganese is present in an amount of between about 0.3 and 0.5% by weight of the body.

17. The ceramic glass body of claim 14 in which the body contains by weight between about 15 and 40% of the glass, and the manganese is present in an amount of between about 0.2 and 1% by weight of the body.

18. The ceramic glass body of claim 17 in which the manganese is present in an amount of between about 0.3 and 0.5% by weight of the body.

19. The ceramic glass body of claim 14 in which the leaded glass is lead, cadmium, bismuth glass.

20. The ceramic glass body of claim 19 in which the manganese is present in an amount between about 0.2 and 1% by weight of the body.

21. The ceramic glass body of claim 20 in which the manganese is present in an amount between about 0.3 and 0.5% by weight of the body and the body contains by weight between 15 and 40% of the glass.

22. The ceramic glass body of claim 21 in which the manganese is present in the amount between 0.3 and 0.5% by weight of the body, the leaded glass is lead cadmium, bismuth glass, and the body contains by weight between about 15 and 40% of the glass.

23. The ceramic glass body of claim 14 in which the material containing the manganese is selected from the group consisting of manganese resinate, manganese dioxide and manganese nitrate.

24. The method of making a ceramic glass body comprising the steps of
mixing together in selected amounts fine particles of barium titanate, leaded glass frit and an additive material containing manganese,
firing the mixture in a non oxidizing atmosphere to a selected temperature between approximately 900° C. and 1025° C. at which the glass softens, and
cooling the fired mixture to form a ceramic glass body.

25. The method of claim 24 in which the additive particles containing manganese are selected from the group consisting of manganese resinate, manganese dioxide and manganese nitrate.

26. The method of claim 25 in which the additive material provides manganese in an amount of between about 0.2 and 1% by weight of the mixture.

27. The method of claim 26 in which the additive material provides manganese in an amount of between about 0.3 and 0.5% by weight of the mixture.

28. The method of claim 27 in which the additive material is manganese resinate, and the glass frit is lead, cadmium, bismuth glass frit present in the amount of about 21% by weight of the mixture.

29. The method of claim 27 in which prior to being mixed with the glass frit and additive material the barium titanate is calcined at a temperature between 1050° C. and 1200° C. for two hours.

30. The method of claim 24 in which the leaded glass frit is lead, cadmium, bismuth glass frit.

31. The method of claim 30 in which the additive material containing manganese is selected from the group consisting of manganese resinate, manganese dioxide and manganese nitrate.

32. The method of claim 31 in which the additive material provides manganese in an amount of between about 0.2 and 1% by weight of the mixture.

33. The method of claim 32 in which the additive material provides manganese in an amount of between about 0.3 and 0.5% by weight of the mixture.

34. The method of claim 33 in which the mixture contains by weight between about 15 and 40% of the glass frit.

35. The method of claim 34 in which prior to being mixed with the glass frit and additive material the barium titanate is calcined at a temperature between 1050° C. and 1200° C. for two hours.

36. The method of making an electrical component having an insulating layer with a high dielectric constant comprising the steps of mixing together in selected amounts fine particles of barium titanate, leaded glass frit and an additive material containing manganese, applying the mixture at least partially over the surface of a conductor containing a non precious metal, firing the mixture and conductive coating in a non oxidizing atmosphere to a selected temperature between approximately 900° C. and 1025° C. at which the glass softens, and cooling the fired mixture and conductor to form a ceramic glass body bonded to the conductor.

37. The method of claim 36 including the step of applying a conductive coating including a non precious metal having a melting point higher than the firing temperature to a surface of the mixture after it is applied to the conductor and before the firing of the mixture so that upon cooling the ceramic glass body formed is bonded to the conductor and the conductive coating.

38. The method of claim 37 in which the conductive coating applied to the mixture contains about 3% by weight of the glass of the mixture.

39. The method of claim 37 in which the conductive coating is applied to a surface of the mixture opposite to the surface contacting the conductor to form after being fired and cooled a capacitor having an insulating layer of high dielectric constant separating the conductor and the conductive layer.

40. The method of claim 39 in which the mixture contains by weight between 15 and 40% of the glass frit, the additive material is selected from the group consisting of manganese resinate, manganese dioxide and manganese nitrate and provides manganese in an amount between about 0.3 and 0.5% by weight of the mixture, and the conductive coating applied to the mixture contains about 3% by weight of the glass of the mixture.

41. The method of claim 36 in which after the ceramic glass body is formed includes the steps of applying a coating of the mixture to a surface of the ceramic glass body opposite to the surface bonded to the conductor, applying to a surface of the coated mixture which is opposite to the surface contacting the ceramic glass body a conductive layer including a non precious metal having a melting point higher than the firing temperature, firing the coated mixture and conductive layer after being applied to the ceramic body in a non oxidizing atmosphere to a selected temperature between approximately 900° C. and 1025° C. at which the glass softens, and cooling the fired mixture and conductive layer together with the ceramic glass body and conductor to form a capacitor having a ceramic glass insulating body of high dielectric constant which separates the conductor and conductive layer.

42. The method of claim 41 in which the mixture contains by weight between 15 and 40% of the glass frit, the additive material is selected from the group consisting of manganese resinate, manganese dioxide and manganese nitrate and provides manganese in an amount between about 0.3 and 0.5% by weight of the mixture, and the conductive coating applied to the mixture contains about 3% by weight of the glass of the mixture.

43. The method of making an electrical capacitor component having an insulating layer with a high dielectric constant and a low dissipation factor comprising the steps of forming a conductive layer of non precious metal on the surface of a substrate, applying to the substrate at least partially over the conductive layer a mixture in selected amounts of fine particles of barium titanate, leaded glass frit and an additive material containing manganese, applying to a surface of the mixture opposite to its surface contacting the conductive layer a conductive coating including a non precious metal having a melting point higher than the firing temperature, firing the coated substrate in a non oxidizing atmosphere to a selected temperature between approximately 900° C. and 1025° C. at which the glass softens, and cooling the substrate to form a ceramic body of high dielectric constant and low dissipation factor between opposite conductive layers to form an electrical capacitor component on the substrate.

44. The method of claim 43 which includes the steps of firing the mixture applied to the substrate prior to applying the conductive coating to form a ceramic glass body, applying a coating of the mixture to an exposed surface of the ceramic glass body opposite to the surface contacting the conductive layer, applying the conductive coating to an exposed surface of the coated mixture opposite to its surface contacting the ceramic glass body, firing the coated substrate in a non oxidizing atmosphere to a selected temperature between approximately 900° C. and 1025° C. at which the glass softens, so that the coated substrate upon cooling forms a ceramic body of high dielectric constant and low dissipation factor between opposite conductive layers to provide an electrical capacitor component on the substrate.

45. The method of claim 44 in which the glass frit is a lead, cadmium, bismuth glass frit and the mixture contains by weight between 15 and 40% of the glass frit, the additive material is selected from the group consisting of manganese resinate, manganese dioxide and manganese nitrate and provides manganese in an amount between about 0.3 and 0.5% by weight of the mixture, and the conductive coating applied to the mixture contains about 3% by weight of the glass of the mixture.

46. A ceramic glass body containing leaded glass characterized by a high dielectric constant and insulation resistance made by mixing together in selected amounts fine particles of barium titanate, leaded glass frit and an additive material containing manganese, firing the mixture in a non oxidizing atmosphere to a selected temperature between approximately 900° C. and 1025° C. at which the glass softens, and cooling the fired mixture to form a ceramic glass body.

47. The body of claim 46 in which the additive particles containing manganese are selected from the group consisting of manganese resinate, manganese dioxide and manganese nitrate.

48. The body of claim 47 in which the additive material provides manganese in an amount of between about 0.2 and 1% by weight of the mixture.

49. The body of claim 48 in which the additive material provides manganese in an amount of between about 0.3 and 0.5% by weight of the mixture.

50. The body of claim 49 in which the additive material is manganese resinate and the glass frit is lead, cadmium, bismuth glass frit present in the amount of about 21% by weight of the mixture.

51. The body of claim 46 in which the leaded glass frit is lead, cadmium, bismuth glass frit.

52. The body of claim 51 in which the additive material containing manganese is selected from the group consisting of manganese resinate, manganese dioxide and manganese nitrate.

53. The body of claim 52 in which the additive material provides manganese in an amount of between about 0.3 and 0.5% by weight of the mixture and the mixture contains by weight between about 15 and 40% of the glass frit.

54. The body of claim 53 in which prior to being mixed with the glass frit and additive material the barium titanate is calcined at a temperature between 1050° C. an 1200° C. for two hours.

55. An electrical component having an insulating layer containing leaded glass bonded to a non precious metal conductor and characterized by a high dielectric constant and insulation resistance made by
mixing together in selected amounts fine particles of barium titanate, leaded glass frit and an additive material containing manganese,
applying the mixture at least partially over the surface of a conductor containing a non precious metal,
firing the mixture and conductive coating in a non oxidizing atmosphere to a selected temperature between approximately 900° C. and 1025° C. at which the glass softens, and
cooling the fired mixture and conductor to form a ceramic glass body bonded to the conductor.

56. The component of claim 55 including the step of applying a conductive coating including a non precious metal having a melting point higher than the firing temperature to a surface of the mixture after it is applied to the conductor and before the firing of the mixture so that upon cooling the ceramic glass body formed is bonded to the conductor and the conductive coating.

57. The component of claim 56 in which the conductive coating applied to the mixture contains about 3% by weight of the glass of the mixture.

58. The component of claim 56 in which the conductive coating is applied to a surface of the mixture opposite to the surface contacting the conductor to form after being fired and cooled a capacitor having an insulating layer of high dielectric constant separating the conductor and the conductive layer.

59. The component of claim 58 in which the mixture contains by weight between 15 and 40% of the glass frit, the additive material is selected from the group consisting of manganese resinate, manganese dioxide and manganese nitrate and provides manganese in an amount between about 0.3 and 0.5% by weight of the mixture, and the conductive coating applied to the mixture contains about 3% by weight of the glass of the mixture.

60. The component of claim 55 in which after the ceramic glass body is formed includes the steps of
applying a coating of the mixture to a surface of the ceramic glass body opposite to the surface bonded to the conductor,
applying to a surface of the coated mixture which is opposite to the surface contacting the ceramic glass body a conductive layer including a non precious metal having a melting point higher than the firing temperature,
firing the coated mixture and conductive layer after being applied to the ceramic body in a non oxidizing atmosphere to a selected temperature between approximately 900° C. and 1025° C. at which the glass softens, and
cooling the fired mixture and conductive layer together with the ceramic glass body and conductor to form a capacitor having a ceramic glass insulating body of high dielectric constant which separates the conductor and conductive layer.

61. The component of claim 60 in which the conductive layer contains about 3% by weight of the glass of the mixture.

62. An electrical capacitor component having an insulating layer bonded to a non precious metal conductor characterized by a high dielectric constant and insulation resistance, and a low dissipation factor made by
forming a conductive layer of non precious metal on the surface of a substrate,
applying to the substrate at least partially over the conductive layer a mixture in selected amounts of fine particles of barium titanate, leaded glass frit and an additive material containing manganese,
applying to a surface of the mixture opposite to its surface contacting the conductive layer a conductive coating including a non precious metal having a melting point higher than the firing temperature,
firing the coated substrate in a non oxidizing atmosphere to a selected temperature between approximately 900° C. and 1025° C. at which the glass softens, and
cooling the substrate to form a ceramic body of high dielectric constant and low dissipation factor between opposite conductive layers to form an electrical capacitor component on the substrate.

63. The component of claim 62 which includes the steps of
firing the mixture applied to the substrate prior to applying the conductive coating to form a ceramic glass body,
applying a coating of the mixture to an exposed surface of the ceramic glass body opposite to the surface contacting the conductive layer,
applying the conductive coating to an exposed surface of the coated mixture opposite to its surface contacting the ceramic glass body,
firing the coated substrate in a non oxidizing atmosphere to a selected temperature between approximately 900° C. and 1025° C. at which the glass softens,
so that the coated substrate upon cooling forms a ceramic body of high dielectric constant and low dissipation factor between opposite conductive layers to provide an electrical capacitor component on the substrate.

64. The component of claim 63 in which the glass frit is a lead, cadmium, bismuth glass frit and the mixture contains by weight between 15 and 40% of the glass frit, the additive material is selected from the group consisting of manganese resinate, manganese dioxide and manganese nitrate and provides manganese in an amount between about 0.3 and 0.5% by weight of the mixture, and the conductive coating applied to the mixture contains about 3% by weight of the glass of the mixture.

* * * * *